(12) United States Patent
DeYoung

(10) Patent No.: US 6,579,147 B1
(45) Date of Patent: Jun. 17, 2003

(54) VENTED BEEHIVE COVER

(76) Inventor: Norman DeYoung, 9392 Beetown Rd., Beetown, WI (US) 53802

( * ) Notice: Subject to any disclaimer, the term of this patent is extended or adjusted under 35 U.S.C. 154(b) by 0 days.

(21) Appl. No.: 10/209,833

(22) Filed: Aug. 1, 2002

(51) Int. Cl.[7] .................... A01K 47/06; A01K 47/00
(52) U.S. Cl. .............................................. 449/15; 449/3
(58) Field of Search .................. 449/3, 7, 13, 15, 449/40, 41

(56) References Cited

U.S. PATENT DOCUMENTS

| | | | |
|---|---|---|---|
| 211,779 A | 1/1879 | Pitts | 449/41 |
| 1,447,713 A | 3/1923 | David | 449/40 |
| 1,468,995 A * | 9/1923 | Cottam | 449/13 |
| 2,039,088 A * | 4/1936 | Knights | 449/41 |
| 3,408,668 A | 11/1968 | Paoletti | 449/31 |
| 4,135,265 A | 1/1979 | Van de Kerkof | 449/13 |
| 4,263,684 A * | 4/1981 | Stevens | 449/13 |
| 4,300,250 A | 11/1981 | Taylor | 449/12 |
| 4,663,791 A | 5/1987 | Nishi | 449/44 |
| 4,981,458 A | 1/1991 | Johnston | 449/7 |
| 5,575,703 A * | 11/1996 | Stearns | 449/13 |
| 5,741,170 A | 4/1998 | Orletsky et al. | 449/30 |

* cited by examiner

Primary Examiner—Charles T. Jordan
Assistant Examiner—Elizabeth Shaw
(74) Attorney, Agent, or Firm—John D. Gugliotta

(57) ABSTRACT

A vented beehive cover is provided for keeping a beehive cooler in hot climates in order to increase honey production. The beehive cover includes a bottom board which has a lower hive body stacked there atop. An upper hive body is stacked atop the lower hive body, and a venting cover encloses the upper hive body. The venting cover shifts with respect to the upper hive body in order to utilize wind direction and maximize cooling of the beehive.

6 Claims, 2 Drawing Sheets

VENTED BEEHIVE COVER

RELATED APPLICATIONS

The present invention was first described in Disclosure Document Registration 502,393 filed on Dec. 17, 2001 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to beekeeping housings and, more particularly, to a vented bee hive cover.

2. Description of the Related Art

The art, hobby and career of beekeeping is one that is enjoyed by many people worldwide. Not only is it a passive and tranquil occupation, it also produces honey and honeycomb which can be an income producing source. While the bees themselves are mostly self-sufficient, they do require some assistance for optimum honey production, especially in the area of man-made hive construction. While improvements over many years have enabled these man-made hives to be almost perfect at providing a suitable habit for the bee, while allowing an easy honey harvest, they are not very good at keeping the bees cool in a hot climate. Some attempts at using electric powered forced air fans have met with some success, but the outside environment quickly takes its toll on the mechanical and electrical components. Also, the electricity to power the fans eats into profits.

A search of the prior art did not disclose any patents that read directly on the claims of the instant invention; however, the following references were considered related.

U.S. Pat. No. 5,741,170 issued in the name of Orletsky et al., describes a hive system for housing a plurality of bee colonies.

U.S. Pat. No. 4,981,458 issued in the name of Johnston, describes a hive complex which maintains multiple clusters of bees.

U.S. Pat. No. 4,663,791 issued in the name of Nishi, describes an artificial honeycomb.

U.S. Pat. No. 4,300,250 issued in the name of Taylor, describes a beehive which features passive solar heating, the venting of moisture, wind protected bee entrances.

U.S. Pat. No. 4,135,265 issued in the name of Van De Kerkof, describes a beehive having internal vents to permit airflow between the first and second space.

U.S. Pat. No. 211,779 issued in the name of Pitts, describes a new and useful beehive.

U.S. Pat. No. 3,408,668 issued in the name of Paoletti, describes a beehive with quick access ways from the bottom to the honey.

U.S. Pat. No. 1,447,713 issued in the name of David, beehive that will house two bee colonies Consequently, there is a need for a means by which bee hives can be kept cool using a passive device without any of the disadvantages as discussed above.

SUMMARY OF THE INVENTION

It is therefore an object of the present invention to provide an improved beekeeping housing.

It is a feature of the present invention to provide an improved bee hive having an integral ventilation means.

Briefly described according to one embodiment of the present invention, the Vented Bee Hive Cover is a screened cover for a beehive. It is used to keep bee hives cool in hot weather, thus improving honey production. It is designed to completely cover the hive yet allow for complete natural ventilation and cooling. In addition to natural cooling, the beating of the wings on the bees aids in air movement and thus allows even more cooling power, through the use of the invention. The cover is made in a box configuration using wood and plywood components, aluminum screening, aluminum covers and corner guards. Its high-quality construction will last for years with no maintenance or operating costs.

The use of the vented bee hive cover allows bees in hot climates to remain cooler, thus increasing honey and honey comb production in a manner which is simple, effective and cost efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
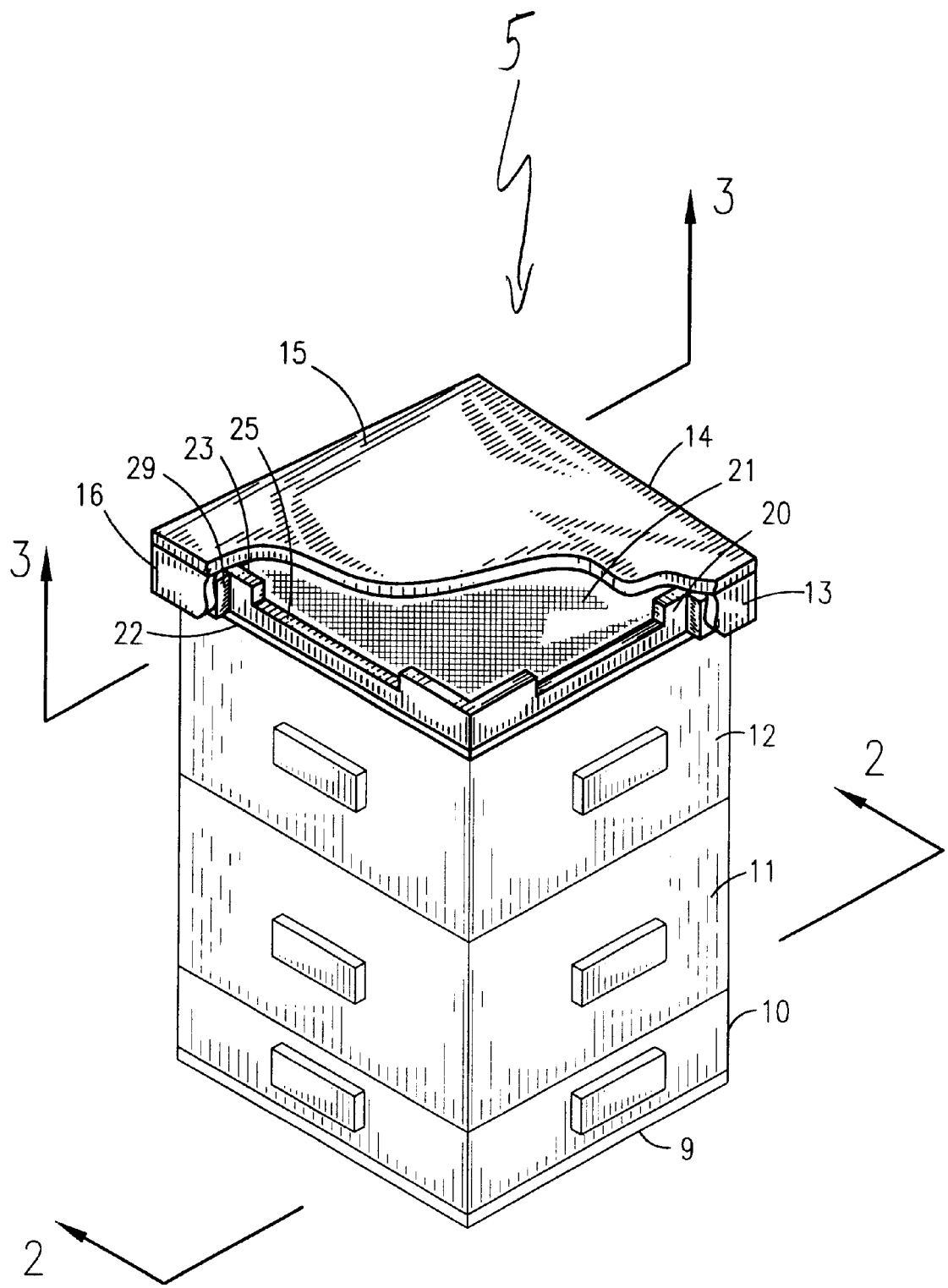
FIG. 1 is a pictorial view of a beehive constructed to embody the principles of the present invention.

Referring now to the drawing, FIG. 1 shows a beehive cover 5 which includes a bottom board 10, lower and upper hive bodies 11,12, stacked onto the bottom board 10, and a novel venting cover 13 enclosing the upper hive body 12.

Lower and upper hive bodies 11, 12 and bottom boards 10 are of commercially available standardized design and construction; therefore they will not be described further herein except to the extent necessary to describe the principles of the present invention.

Figure 2:
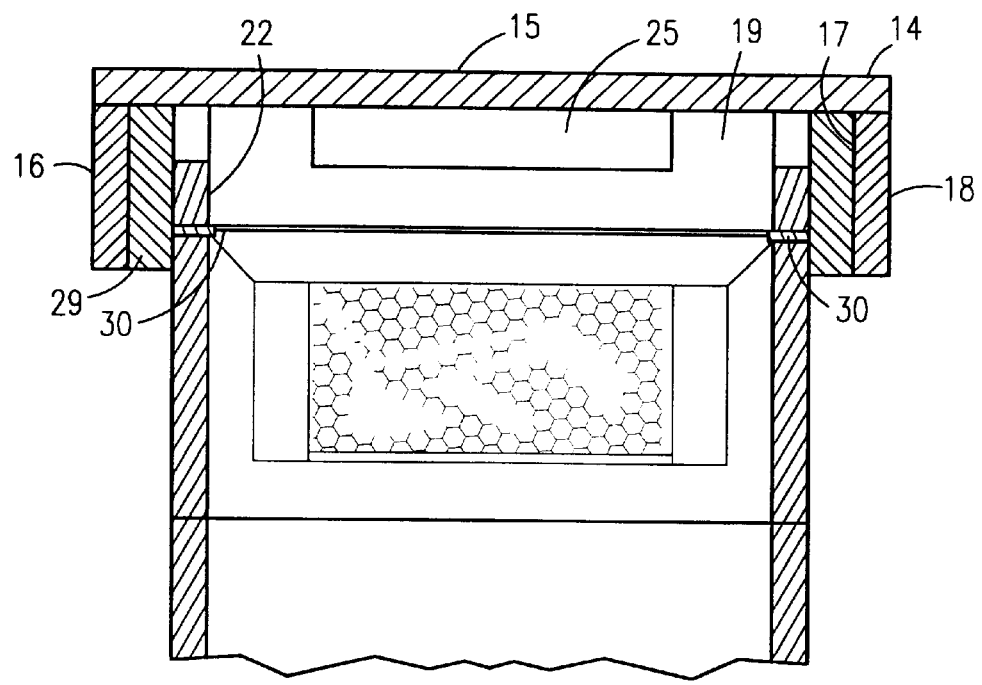
FIG. 2 is a section through the beehive shown in FIG. 1; the section is taken substantially along line 2—2 of FIG. 1.
Figure 3:
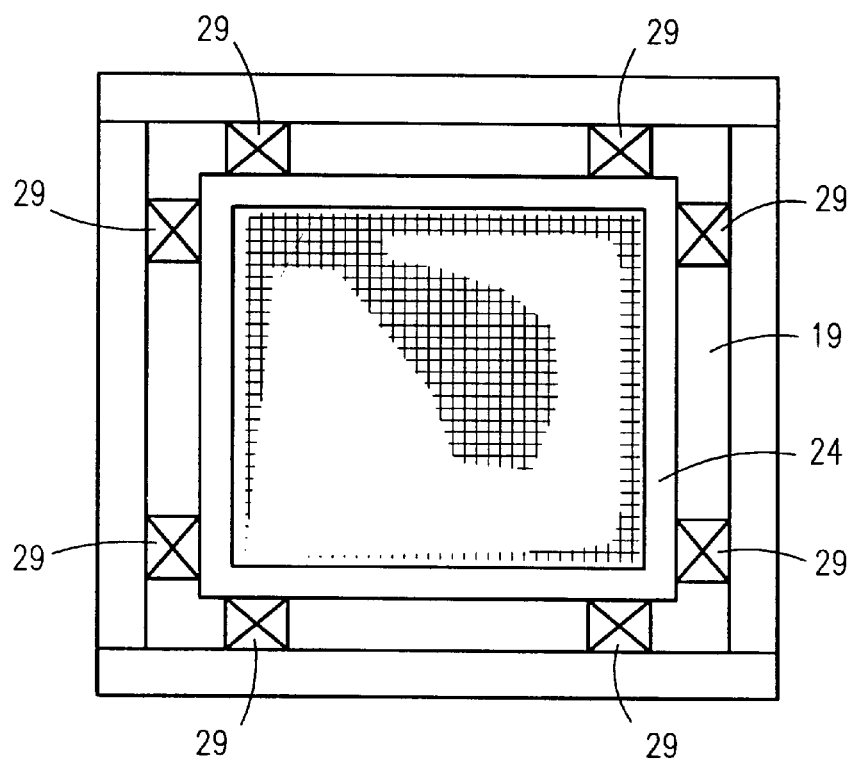
FIG. 3 is a section through the top section of the beehive shown in FIG. 1; the section is taken substantially along line 3—3 of FIG. 1.

Referring now to FIGS. 1 to 3 venting cover 13 has an outer part 14 an inner part 20 and at least five spacer cleats 29.

The outer part 14 comprises a top 15 having downward depending outer members 16. The area of the top 15 best shown in FIG. 2 defined by the outer members 16 is larger than the area of the upper hive body 12 upon which the venting cover 13 sits. The difference in area allows for ventilation openings 19 shown in FIG. 3 between the outer part 14 and the inner part 20. Each outer member 16 has an inside and an outside surface 17,18. Enclosed within this outer part 14 is the inner part 20.

The inner part 20 shown in section in FIGS. 2 and 3, has a mesh bottom 21, upward depending inner members 22, and tack strips 30. The inner members 22 have upper and lower surfaces 23, 24. The mesh bottom 21 is made of a corrosion resistant screen material through which the bees cannot pass. The mesh bottom 21 is held in place between tack strips 30 shown in section in FIG. 2 and the lower surface 23 of the inner members 22. At least one large U-shaped ventilation notch 25 shown in FIGS. 1 and 2 is cut out of the upper surface 23 of each of the inner members 22.

The inner part 20 of the venting cover 13 rests upon the upper hive body 12.

Five spacer cleats 29 as shown in FIG. 3 are fastened to the inside surface 17 of the outer members 16 to keep the correct range of spacing between the inner part 20 and the outer part 14. Spacer cleats 29 extend beyond the height of the inner part 20 in order to provide stand off for the venting cover 13 when it is placed over the upper hive body 12. Spacer cleats 29 do not completely surround the upper hive body so that the venting cover 13 can be shifted with respect to the upper hive body 12 to take advantage of wind direction and to maximize the Venturi effect cooling of the beehive 9. The ability to shift the venting cover 13 with respect to the upper hive body 12 differentiates the present invention from the ventilating cover shown in Taylor.

A ventilated void 28 as shown in FIG. 2 is created by the top 15, the inner members 22 and the mesh bottom 21 when the inner part 20 and outer part 14 are fastened together. This ventilated void 28 allows for heat to build up outside of the beehive 9 and eventually ventilate out of the upper hive body 12. By fanning with their wings bees in the upper hive body 12 can push hot air out of the ventilated void 19 and out of the beehive 9. During hot summer months constant bee fanning along with the venting cover 13 has been proven to keep the hive temperature steady.

Unlike prior art ventilating covers the present invention is the first to be specifically designed for warm weather venting. The mesh area is as large as can possibly be adapted to a standard hive body. The generous ventilation openings 19 are designed to take full advantage of the large mesh area. In hot weather bees will not work in the upper hive body 12. The present invention cools the upper hive body 12 enough to allow the bees to continue to fan in order to reduce the moisture out of the nectar to produce honey.

The venting cover 13 in the present invention is simpler in construction than the Van de Kerkof cover. The ventilation mesh in the present invention is one piece while in the Van de Kerkoff invention it is made up of 4 separate mesh pieces. The Van de Kerkof invention is also made up of three major components while the present invention is made up of two major components. Even though this venting cover 13 is simpler than the Van de Kerkof venting cover 13 it still allows the beehive 9 to vent without the use of the entrance of the beehive 9 for ventilation. This makes the beehive 9 easier to defend against natural enemies of the bees. In prior art beehives, on warm days the bee entrance had to be full opened to permit adequate ventilation which opened up the beehive to attack.

The foregoing descriptions of specific embodiments of the present invention have been,presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A beehive cover comprising:
   a bottom board;
   a lower hive body, said lower hive body is stacked onto said bottom board;
   an upper hive body, said upper hive body is stacked onto said lower hive body; and
   a venting cover, said venting cover encloses said upper hive body, wherein said venting cover includes an outer part, an inner part, and a plurality of spacer cleats, said inner part is enclosed within said outer part, said outer part and said inner part having ventilation openings located therebetween, and wherein said inner part of said venting cover rests upon said upper hive body;
   wherein said outer part comprises a top having downward depending outer members, said outer members having a larger square area than said upper hive body; and wherein each of said outer members has an inside surface and an outside surface, said inside surface has said spacer cleats fastened thereto so as to facilitate a correct range of spacing between said inner part and said outer part of said venting cover, said spacer cleats extend beyond a height of said inner part in order to provide stand off for said venting cover upon placement of said venting cover over said upper hive body, thereby allowing said venting cover to be shifted with respect to said upper hive body in order to utilize wind direction and maximize cooling of a beehive.

2. A beehive cover comprising:
   a bottom board;
   a lower hive body, said lower hive body is stacked onto said bottom board;
   an upper hive body, said upper hive body is stacked onto said lower hive body; and
   a venting cover, said venting cover encloses said upper hive body, wherein said venting cover includes an outer part, an inner part, and a plurality of spacer cleats, said inner part is enclosed within said outer part, said outer part and said inner part having ventilation openings located therebetween, and wherein said inner part of said venting cover rests upon said upper hive body, and wherein said inner part includes a mesh bottom, upward depending inner members, and tack strips, wherein each of said inner members has an upper surface and a lower surface.

3. The beehive cover of claim 2, wherein said mesh bottom is fabricated of a corrosion resistant screen material through which bees cannot pass.

4. The beehive cover of claim 2, wherein said mesh bottom is held in place between said tack strips and said lower surface of said inner members.

5. The beehive cover of claim 2, wherein said upper surface of each of said inner members has at least one large U-shaped ventilation notch.

6. The beehive cover of claim 2, wherein said inner part and said outer part of said venting cover are manually fastened, thus creating a ventilated void between said top of said outer part, said inner members, and said mesh bottom, wherein said ventilated void allows for heat to build up outside of said beehive and ventilate out of said upper hive body.

* * * * *